US012640061B2

(12) United States Patent
Ceschia et al.

(10) Patent No.: US 12,640,061 B2
(45) Date of Patent: May 26, 2026

(54) TAG FOR PROVIDING THE INFORMATION OF A RAIL

(71) Applicant: GOLDSCHMIDT HOLDING GMBH, Leipzig (DE)

(72) Inventors: Karsten Ceschia, Naunhof (DE); Sven Kummer, Wiedemar (DE); Richard Schienbein, Leipzig (DE); Thomas Reinicke, Salzata (DE)

(73) Assignee: GOLDSCHMIDT HOLDING GMBH, Leipzig (DE)

( * ) Notice: Subject to any disclaimer, the term of this patent is extended or adjusted under 35 U.S.C. 154(b) by 167 days.

(21) Appl. No.: 18/289,980

(22) PCT Filed: May 12, 2022

(86) PCT No.: PCT/EP2022/062916

§ 371 (c)(1),
(2) Date: Nov. 8, 2023

(87) PCT Pub. No.: WO2022/248239

PCT Pub. Date: Dec. 1, 2022

(65) Prior Publication Data

US 2024/0265832 A1 Aug. 8, 2024

(30) Foreign Application Priority Data

May 27, 2021 (EP) .................................... 21176103

(51) Int. Cl.
*E01B 26/00* (2006.01)
*G09F 3/00* (2006.01)
(Continued)

(52) U.S. Cl.
CPC ................ *G09F 3/10* (2013.01); *E01B 26/00* (2013.01); *G09F 3/0297* (2013.01); *G09F 2003/0202* (2013.01)

(58) Field of Classification Search
CPC ... E01B 26/00; E01B 9/02; G09F 3/10; G09F 3/0297; G09F 2003/0202
See application file for complete search history.

(56) References Cited

U.S. PATENT DOCUMENTS

| | | | | |
|---|---|---|---|---|
| 1,222,575 A | | 4/1917 | Newkirk | |
| 4,826,078 A | * | 5/1989 | Arvin | H01R 4/26 238/14.05 |

(Continued)

FOREIGN PATENT DOCUMENTS

| | | |
|---|---|---|
| DE | 19914662 A1 | 10/2000 |
| JP | 2001-195001 A | 7/2001 |

(Continued)

OTHER PUBLICATIONS

Jul. 13, 2022 International Search Report issued in International Patent Application No. PCT/EP2022/062916.

(Continued)

*Primary Examiner* — Cassandra Davis
(74) *Attorney, Agent, or Firm* — Oliff PLC

(57) ABSTRACT

A tag for providing the information of a rail, the rail including a rail head, a rail web and a rail foot. The tag is configured to be attached to the rail foot in the transverse direction of the rail, including: a base body which partially encloses the rail foot, and a label which contains information of the rail.

23 Claims, 10 Drawing Sheets

(51) Int. Cl.
*G09F 3/10* (2006.01)
*G09F 3/02* (2006.01)

(56) References Cited

U.S. PATENT DOCUMENTS

| | | | | | |
|---|---|---|---|---|---|
| 2014/0054389 | A1* | 2/2014 | Reichle | E01B 26/00 238/310 |
| 2014/0367462 | A1* | 12/2014 | Duan | B61L 25/025 235/375 |
| 2021/0054574 | A1* | 2/2021 | Graham | E01B 7/24 |

FOREIGN PATENT DOCUMENTS

| | | | | |
|---|---|---|---|---|
| JP | 3151921 | U | 7/2009 | |
| WO | 2015/124834 | A1 | 8/2015 | |
| WO | WO-2017045839 | A1 * | 3/2017 | E01B 5/00 |

OTHER PUBLICATIONS

Jul. 13, 2022 Written Opinion issued in International Patent Application No. PCT/EP2022/062916.
Jul. 20, 2023 International Preliminary Report on Patentability issued in International Patent Application No. PCT/ EP2022/ 062916.
Oct. 25, 2021 Search Report issued in European Patent Application No. 21176103.6.

* cited by examiner

TAG FOR PROVIDING THE INFORMATION OF A RAIL

TECHNICAL FIELD

The present invention relates to a tag for providing the information of a rail and/or a weld joint of a rail.

BACKGROUND ART

At the end of the nineteenth century, aluminothermic welding was invented to weld rail tracks with the development of the metallurgical and chemical industries. To prepare aluminothermic welding for connecting two rail ends and to obtain a desired certain metallic structure in the welding gap, a worker should understand the characteristics of a rail. Also, to check a weld joint of a rail, a worker should also understand the characteristics and the history of the weld joint. Therefore, the information of a rail or a weld joint of a rail becomes crucial for workers to prepare the welding or future repair and maintenance of a rail. Namely, before/during/after welding, workers need to obtain information of the rail or of the weld joint of the rail.

However, the conventional method is to use a rail clamp to cover the whole bottom of a rail foot and clamping the two sides of the rail foot, which may lead to damage of a rail. Also, it takes much time to attaching such conventional rail clamp to the rail foot and thus is not efficient for installation. Hence, a conventional rail clamp does not provide a fast-marking, non-destructive and stable-fastening tag for providing the information of a rail.

Technical Problem to be Solved

The objective of the present invention is to provide a fast-marking, non-destructive and stable-fastening tag for providing the information of a rail.

SUMMARY OF THE INVENTION

The following summarizes some aspects of the present invention to provide a basic understanding of the technology discussed. This summary is not an extensive overview of all contemplated features of the invention, and is intended neither to identify key or critical elements of all aspects of the invention nor to delineate the scope of any or all aspects of the invention. Its sole purpose is to present some concepts of one or more aspects of the invention in a summary form as a prelude to the more detailed description that is presented later.

A first aspect of the present invention provides a tag for providing the information of a rail, the rail comprising a rail head, a rail web and a rail foot, the tag configured to be attached to the rail foot in the transverse direction of the rail, comprising: a base body which partially encloses the rail foot, and a label which contains information of the rail.

In a second aspect of the present invention according to the first aspect, wherein the base body includes an upper lip and a lower lip, the label located on the upper side of the upper lip.

In a third aspect of the present invention according to the second aspect, further comprising a fastener that attaches the base body to the rail, the fastener located on the upper side of the lower lip.

In a fourth aspect of the present invention according to the third aspect, wherein the fastener is made of magnet, adhesive material, or any fastening means, the adhesive material including adhesive glues, an adhesive tape, or an adhesive strip, the fastening means including embedded attachment, interlocking attachment, a hook and loop fastener, a cable tie, or a spring.

In a fifth aspect of the present invention according to the third or fourth aspect, wherein the fastener is used for attaching the tag to the bottom of the rail foot.

In a sixth aspect of the present invention according to the second aspect, wherein the base body includes another upper lip, the lower lip extending along the bottom of the rail foot and integrally connecting the two upper lips, the two upper lips respectively holding the two sides of the rail foot.

In a seventh aspect of the present invention according to the sixth aspect, wherein the upper lip includes an engaging tip for holding the tag onto the rail foot.

In an eighth aspect of the present invention according to the seventh aspect, wherein the base body includes a groove on the upper side of the lower tip and the engaging tip includes a slope feature.

In a ninth aspect of the present invention according to one of the second to eighth aspects, wherein the underside of the upper lip is configured to be compatible with the profile of the rail foot.

In a tenth aspect of the present invention according to one of the second to ninth aspects, wherein the underside of the lower lip includes a reinforcing protrusion.

In an eleventh aspect of the present invention according to one of the first to tenth aspects, wherein the label is designed as an adhesive sticker or as an imprint which is made by printing, laser engraving or cutting, or as electronic data identification, the label including a two-dimensional code (e.g., QR code or data matrix).

In a twelfth aspect of the present invention according to one of the first to eleventh aspects, wherein the upper lip is disposed horizontally or at an angle to allow the label to be read.

In a thirteenth aspect of the present invention according to one of the first to twelfth aspects, wherein the rail includes a weld joint.

In a fourteenth aspect of the present invention according to one of the second to thirteenth aspects, wherein the base body is made of rubber, plastic, metal, wood, or polymer composite.

In a fifteenth aspect of the present invention according to one of the first to fourteenth aspects, wherein the information includes the used process and material, date of execution, ingredient, quality, characteristic, function, feature, purpose, history, or use of the rail or of a weld joint of the rail.

Advantageously, the present invention aims to provide a fast-marking, non-destructive and stable-fastening tag for providing the information of a rail.

Further benefits and advantages of the present invention will become apparent after a careful reading of the detailed description with appropriate reference to the accompanying drawings.

DETAILED DESCRIPTION

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

Figure 1:
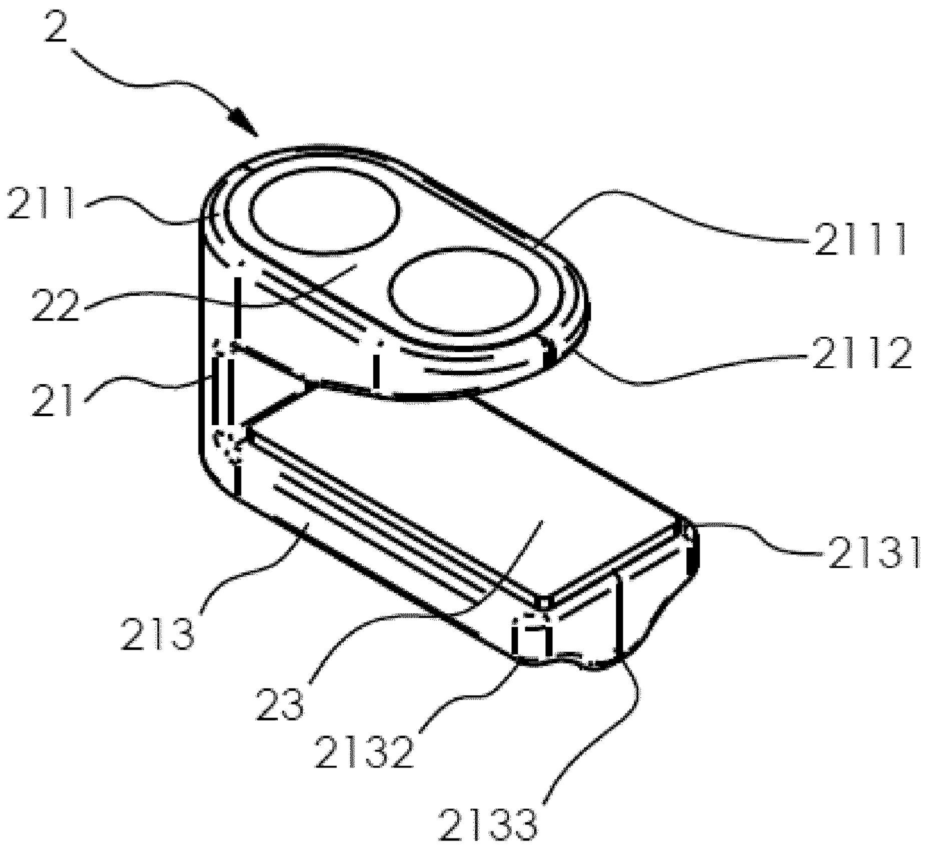
FIG. 1 is a perspective view of a tag for providing the information of a rail in accordance with the first embodiment of the present invention.
Figure 2:
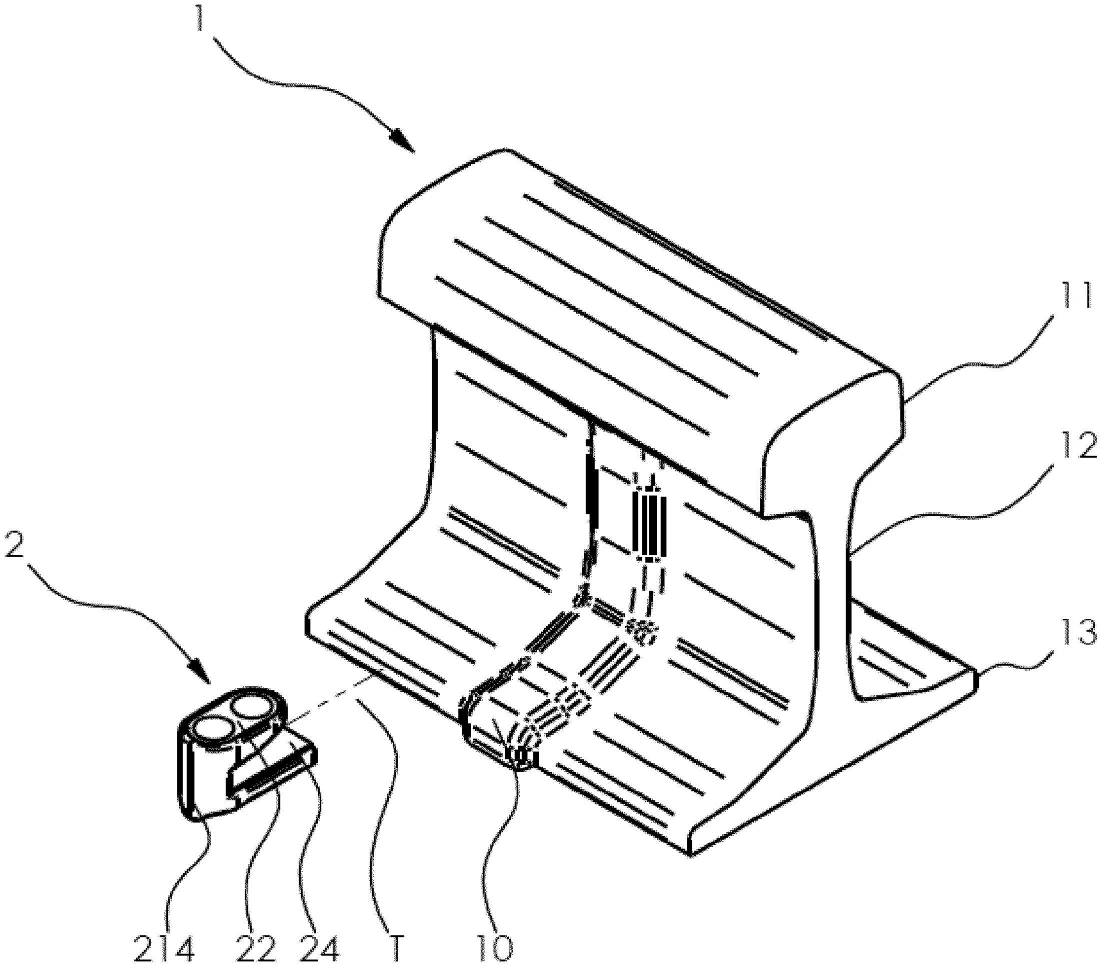
FIG. 2 is a perspective view of a tag of FIG. 1 which is to be applied to a rail.
Figure 3:
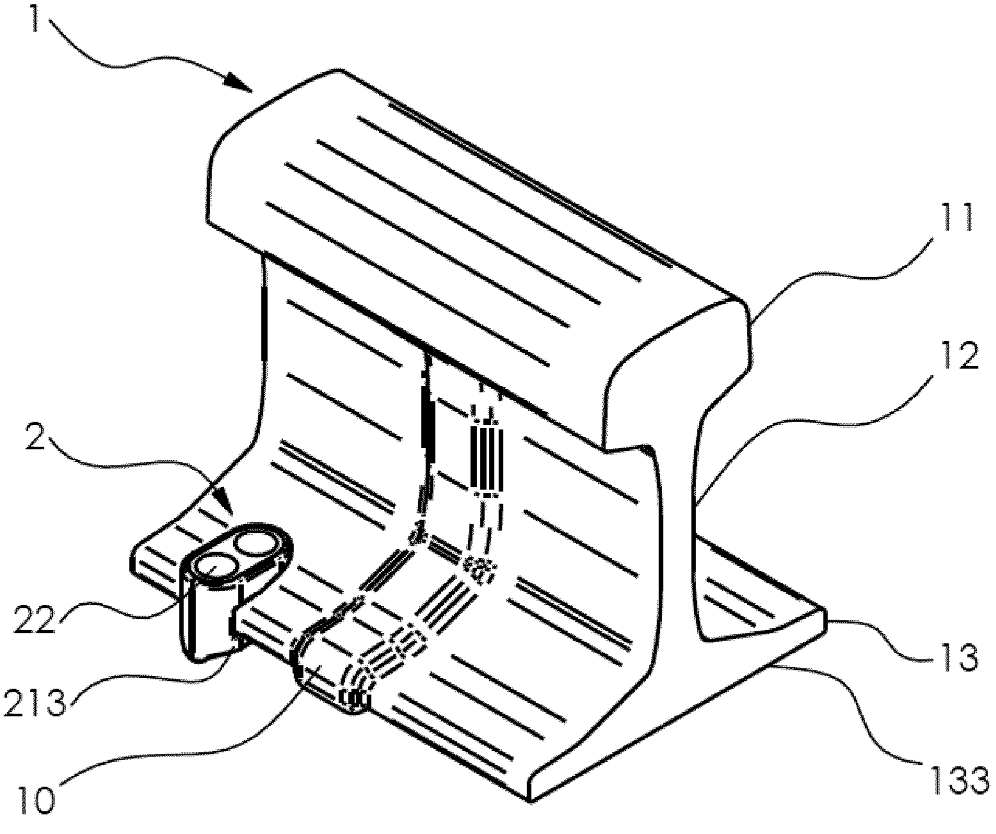
FIG. 3 is a perspective view of a tag of FIG. 1 which is applied to a rail.
Figure 4:
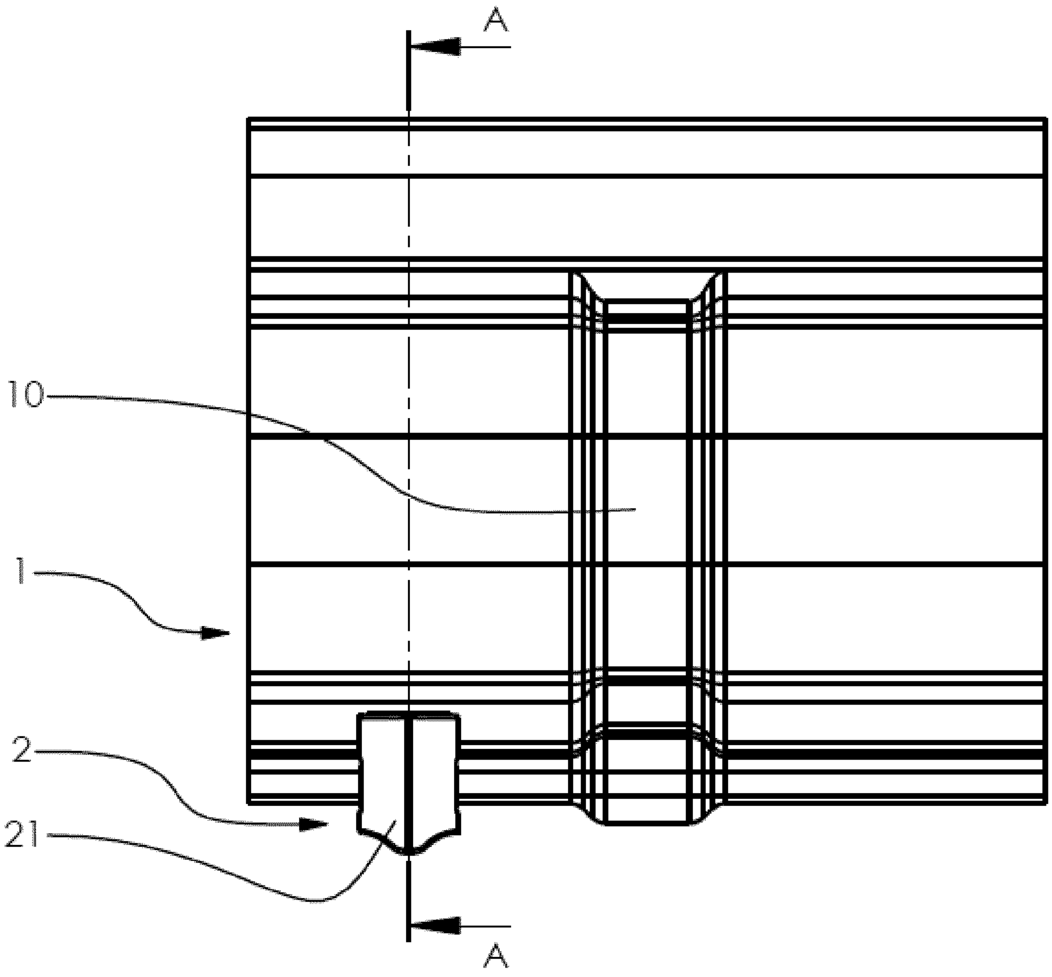
FIG. 4 is a side view of FIG. 3.
Figure 5:
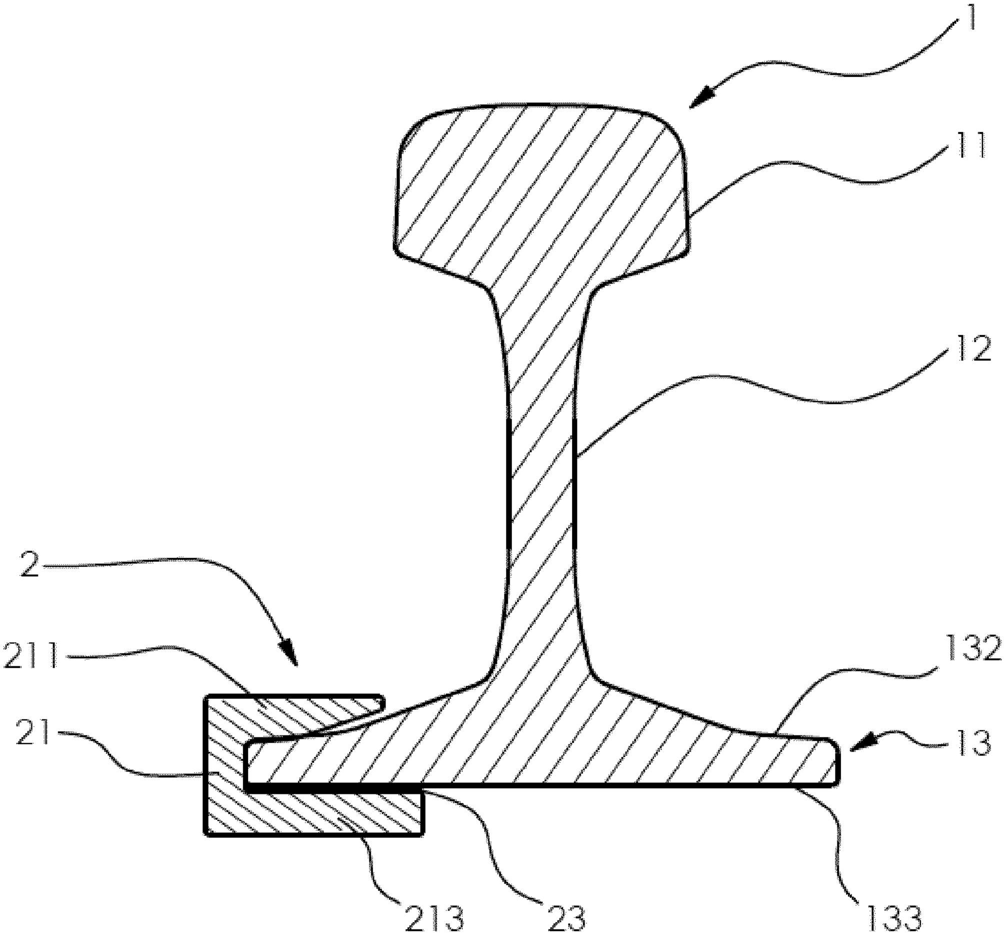
FIG. 5 is a cross-section view taken along the line A-A of FIG. 4.
Figure 6:
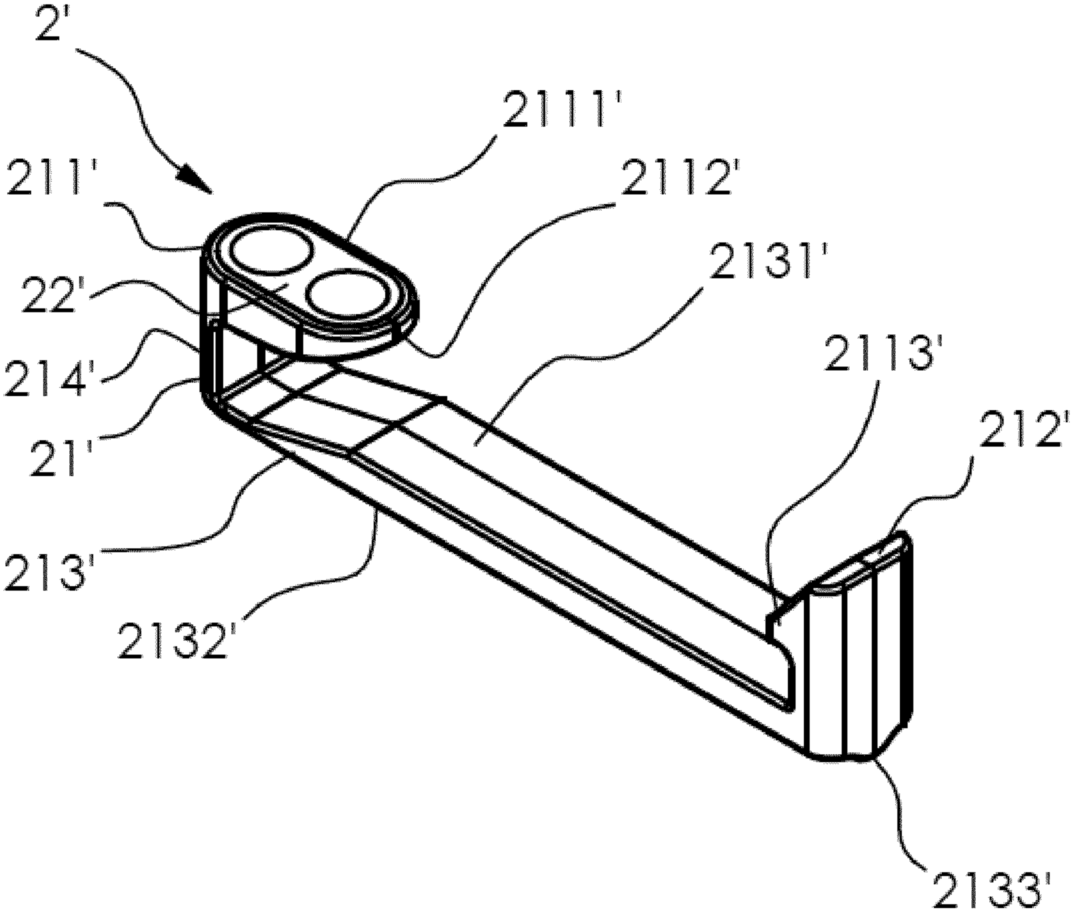
FIG. 6 is a perspective view of a tag for providing the information of a rail in accordance with the second embodiment of the present invention.
Figure 7:
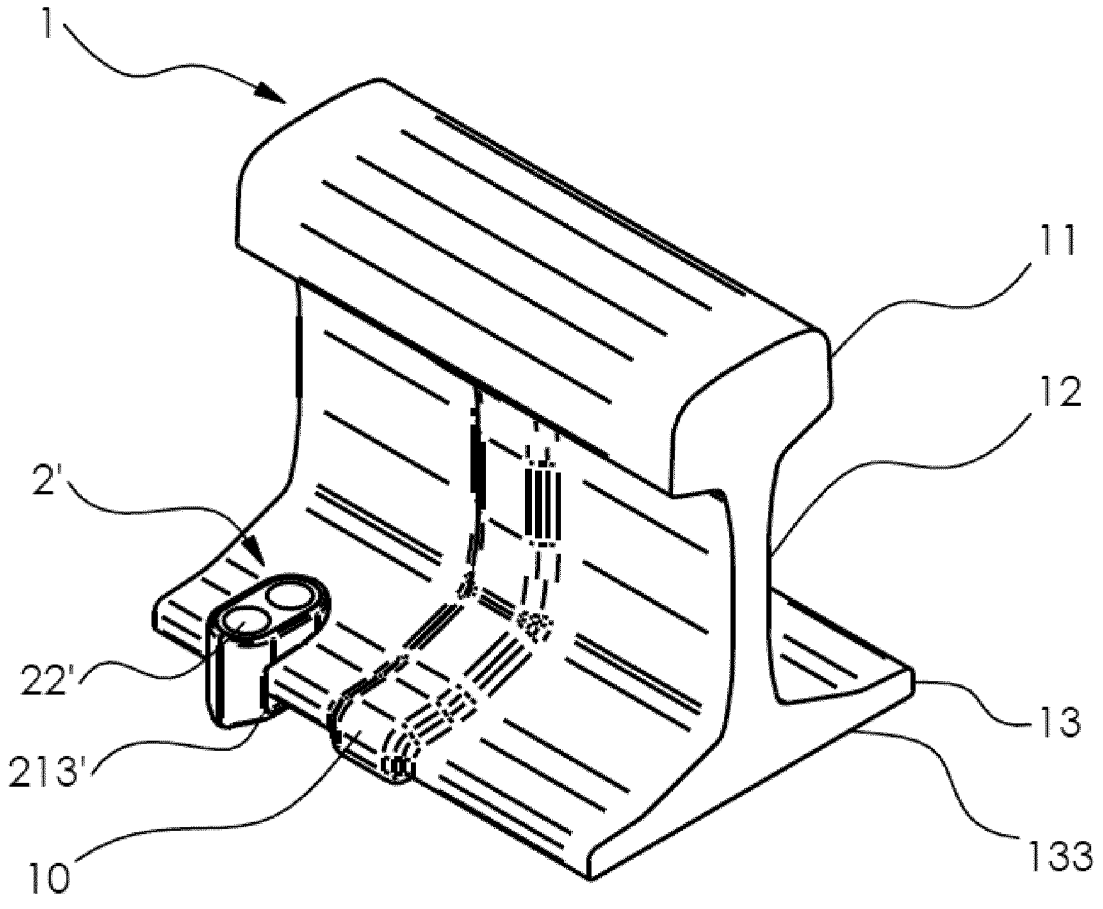
FIG. 7 is a perspective view of a tag of FIG. 6 which is applied to a rail.
Figure 8:
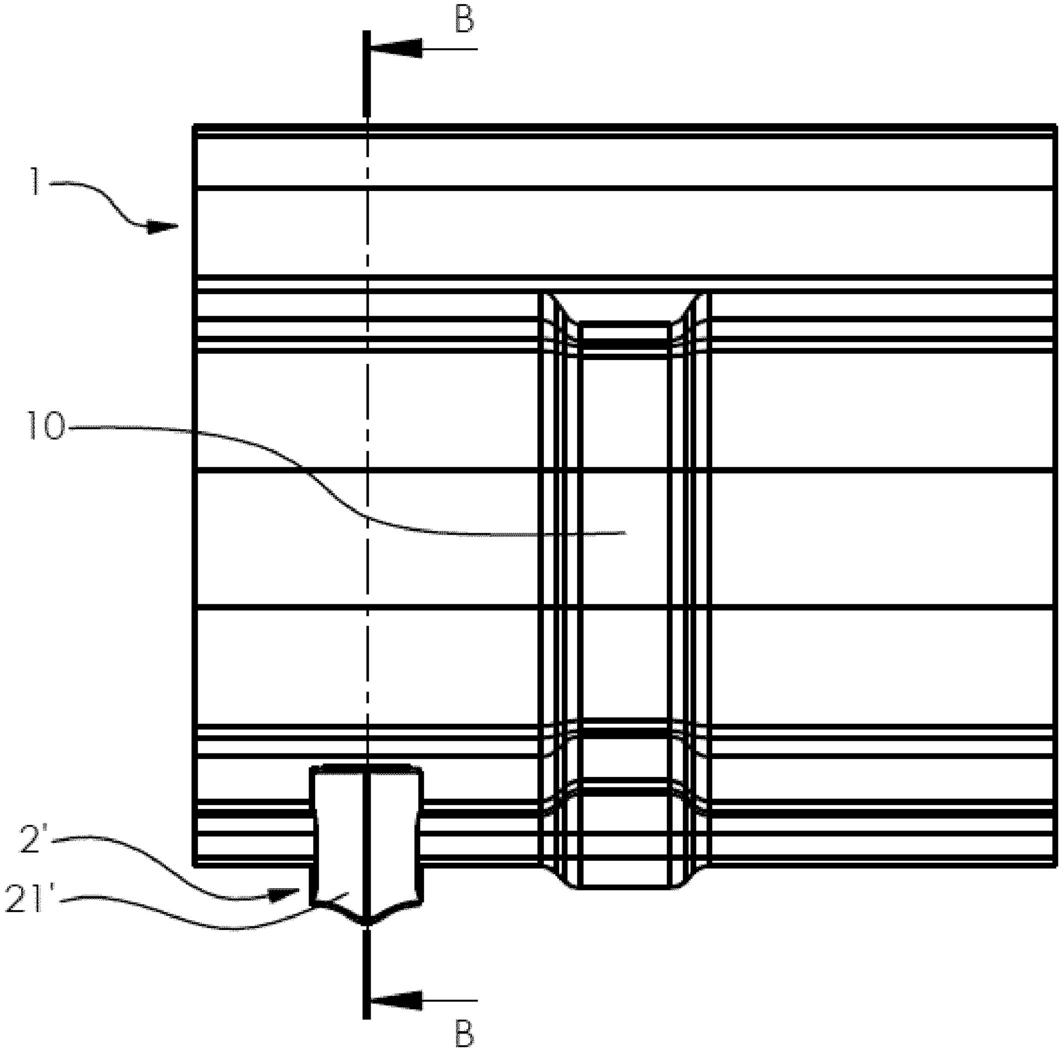
FIG. 8 is a side view of FIG. 7.
Figure 9:
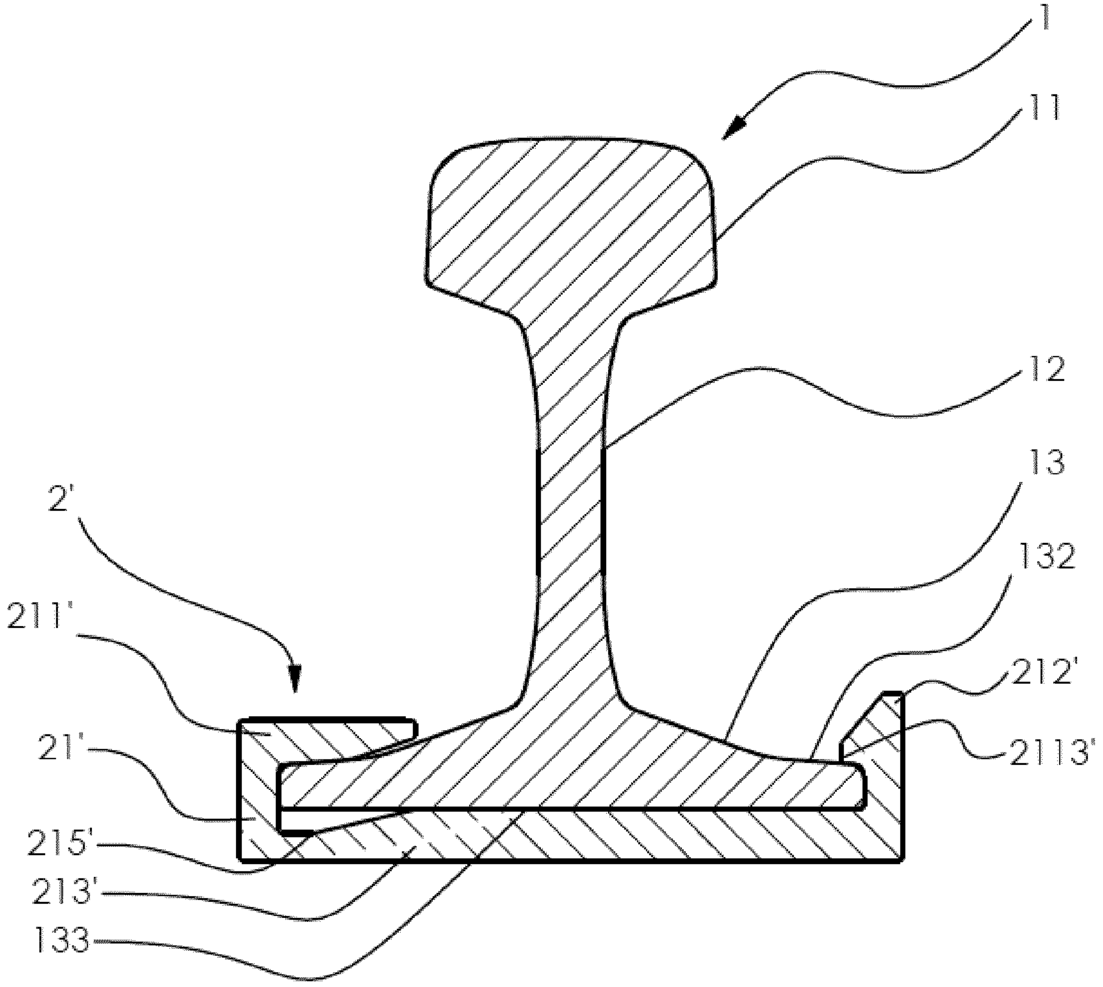
FIG. 9 is a cross-section view taken along the line B-B of FIG. 8.
Figure 10:
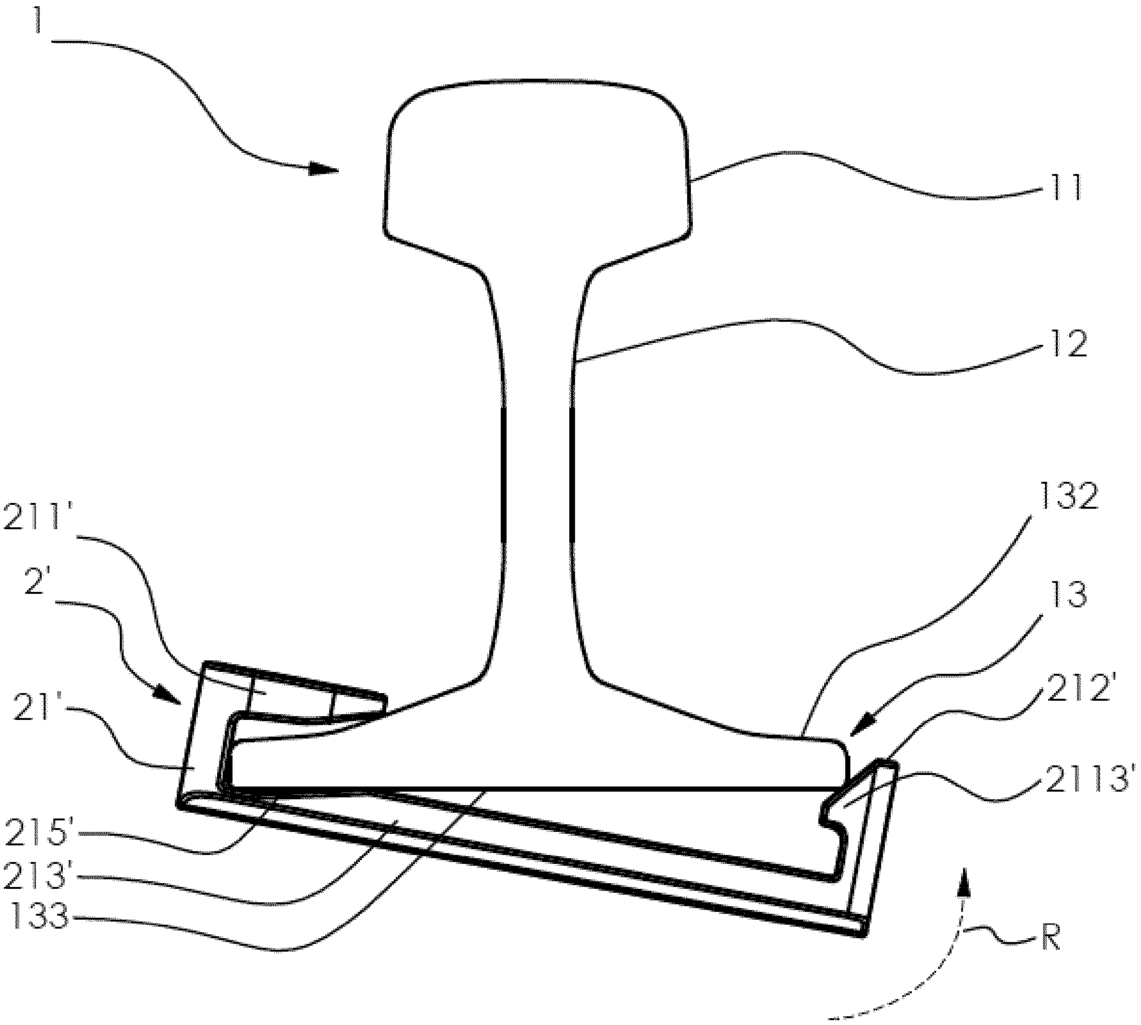
FIG. 10 is an illustrated view showing how the tag of FIG. 6 is applied to a rail.

FIG. 1 is a perspective view of a tag for providing the information of a rail in accordance with the first embodiment of the present invention. FIG. 2 is a perspective view of a tag of FIG. 1 which is to be applied to a rail. FIG. 3 is a perspective view of a tag of FIG. 1 which is applied to a rail. FIG. 4 is a side view of FIG. 3. FIG. 5 is a cross-section view taken along the line A-A of FIG. 4. FIG. 6 is a perspective view of a tag for providing the information of a rail in accordance with the second embodiment of the present invention. FIG. 7 is a perspective view of a tag of FIG. 6 which is applied to a rail. FIG. 8 is a side view of FIG. 7. FIG. 9 is a cross-section view taken along the line B-B of FIG. 8. FIG. 10 is an illustrated view showing how the tag of FIG. 6 is applied to a rail.

Please refer to FIGS. 1-10 together. A rail 1 comprises a rail head 11, a rail web 12, and a rail foot 13. The rail 1 can also include a weld joint 10, such as an aluminothermic welding joint. The present invention can be applied to all types and all lengths of rails. The rail 1 shown in the drawings is illustrated just as a simplified section of rails for the purpose of the explanation. The first embodiment and the second embodiment provide a tag 2, 2' for providing the information of a rail 1. The tag 2, 2' is configured to be attached to the rail foot 13 in the transverse direction T of the rail 1. For example, after the repair of a specific section of a rail 1, a rail worker can efficiently apply the tag 2, 2' to the rail foot 13 of a rail 1. Later, if a worker wants to obtain the property of the specific section of the rail 1, the worker can simply check the information shown on the tag 2, 2' that is attached to the specific section of the rail 1. Namely, if a worker wants to obtain the information of the rail 1, a worker does not need to inspect or test the rail 1 itself again. The information includes the used process and material, date of execution, ingredient, quality, characteristic, function, feature, purpose, history, or use of the rail 1 or of a weld joint 10 of the rail 1.

Specifically, the tag 2, 2' comprises a base body 21, 21' and a label 22, 22'. The base body 21, 21' partially encloses the rail foot 13, holding onto the top 132 of the rail foot 13 and the bottom 133 of the rail foot 13 so that the tag 2, 2' is stably attached to the rail 1. In a preferred embodiment, the base body 21, 21' is made of rubber, plastic, metal, wood, or polymer composite. The base body 21, 21' includes an upper lip 211, 211' and a lower lip 213, 213'. The label 22, 22' is located on the upper side 2111, 2111' of the upper lip 211, 211'.

A label 22, 22' contains information of the rail 1. The label 22, 22' is mounted on upper side 2111, 2111' of the upper lip 211, 211'. The upper lip 211, 211' is disposed horizontally or at an angle to allow the label 22, 22' to be read. In a preferred embodiment, the label 22, 22' is designed as an adhesive sticker or as an imprint which is made by printing, laser engraving or cutting, the label 22, 22' including a two-dimensional code (e.g., QR code or data matrix), a mark, a trademark, a logo, or a company name. In an embodiment, the upper side 2111, 2111' of the upper lip 211, 211' includes a grooved platform for receiving the label 22, 22'. In another embodiment, the upper side 2111, 2111' of the upper lip 211, 211' is a flatten plane.

The present invention can be categorized into two main embodiments in respect of the attachment to the rail foot 13.

First Embodiment

Please refer to FIGS. 1-5 together. The tag 2 of the first embodiment further comprises a fastener 23. The fastener 23 is made of magnet, adhesive material, or any fastening means. The magnet can attach to the rail 1 in a non-destructive and efficient manner. The adhesive material can be adhesive glues, an adhesive tape, or an adhesive strip. The adhesive tape or the adhesive strip can be two sided so that they can stick to the base body 21 and the rail foot 13. The fastening means may be any kind of embedded attachment, interlocking attachment, a hook and loop fastener, a cable tie, a spring and so on. The fastener 23 is located on the upper side 2131 of the lower lip 213 and attaches the base body 21 to the rail 1 in a substantially non-detachable manner. Particularly, the fastener 23 is used for attaching the tag 2 to the bottom 133 of the rail foot 13. In this way, the fastener 23 achieves a stable attachment between the tag 2 and the rail 1. In a preferred embodiment, the tag 2 attaches only to the bottom 133 of the rail foot 13 by the fastener 23. In a preferred embodiment, the fastening means can also be a spring which is used for fastening the tag 2 to the rail 1. The spring is located on the upper side 2131 of the lower lip 213. When a worker wants to apply the tag 2 to the rail 1, he or she can compress the spring and put the tag 2 into the rail foot 13. The spring then is relaxed and exerts a force against the rail foot 13 so that the upper lip 211 and the lower lip 213 and the spring is fastened on the rail 1.

Second Embodiment

Please refer to FIGS. 6-10 together in reference to FIGS. 1-5. In the tag 2' of the second embodiment, the base body 21' includes another upper lip 211'. The two upper lips 211', 212' respectively holding the two sides of the rail foot 13. The lower lip 213' extends along the bottom 133 of the rail foot 13 and integrally connecting the two upper lips 211', 212'. In other words, the two upper lips 211', 212' and the lower lip 213' are integrally formed. In a preferred embodiment, the base body 21' of the second embodiment may be made of flexible materials, such as rubber, plastics, fibres, metal materials, wood, or polymer composite. When applying the tag 2' to the rail foot 13, a worker may slightly bend the tag 2' so that the tag 2' can accommodate and hold onto the rail foot 13. The two upper lips 211', 212' hold the top 132 of the rail foot 13 at two sides of the rail 1.

The label 22' is disposed on one of the two upper lips 211', 212' on either side of the rail 1. In another embodiment, the label 22' can be provided on both the two upper lips 211', 212'. In a preferred embodiment similar to the first embodiment, a fastener including magnet or adhesive materials can also be provided on the lower lip 213' of the second embodiment, increasing the stabilization of the tag 2'. The upper lip 211' includes an engaging tip 2113' for holding the tag 2' onto the rail foot 13. The base body 21' includes a groove 215' on the upper side of the lower tip so that a worker can easily install the tag 2' onto the rail foot 13 without hugely bending the tag 2'. In addition, the engaging tip 2113' includes a slope feature, which also realizes the easier installation of the tag 2' onto the rail foot 13. For example, please refer to FIG. 10. A worker can first take advantage of the groove 215' to apply the tag 2' partially to one side of the rail foot 13; and then can slightly rotate the tag 2' in relative to the groove 215' in the direction R and take advantage of the slope feature of the engaging tip 2113' so that the upper tip 212' slides onto the top 132 of the rail foot 13 from the bottom 133 of the rail foot 13. In this way, the tag 2' can firmly attach to the rail foot 13.

Please refer to FIGS. 1-10 together. In order to adapt to different types of rails, the underside 2112, 2112' of the upper lip 211, 211' is configured to be compatible with the profile of the rail foot 13, preferably an inclining shape of the underside 2112, 2112' of the upper lip 211, 211' which also helps the attachment of the tag 2, 2' and the rail foot 13, whereby the maximum static friction applied by the fastener 23 may prevent subsequent removal of the tag 2, 2' from the rail 1.

To optimize the strength and stability of the tag 2, 2', the underside 2132, 2132' of the lower lip 213, 213' includes a reinforcing protrusion 2133, 2133'. The back 214, 214' of the base body 21, 21' is rounded to make unintentional removal of the tag 2, 2' from the rail 1 more difficult.

In sum, the present invention creates a non-destructive and firm connection between the tag 2, 2' and the rail 1.

LIST OF ELEMENTS

1 rail
10 weld joint
11 rail head
12 rail web
13 rail foot
132 top of the rail foot
133 bottom of the rail foot
T transverse direction
R direction
2, 2' tag
21,21' basebody
211, 211' upper lip
2111, 2111' upper side of the upper lip
2112, 2112' underside of the upper lip
2113' engaging tip
212' another upper lip
213, 213' lower lip
2131, 2131' upper side of the lower lip
2132, 2132' underside of the lower lip
2133, 2133' reinforcing protrusion
214, 214' back of the base body
215' groove
22, 22' label
23 fastener

The invention claimed is:

1. A tag for providing information of a rail, the rail comprising a rail head, a rail web and a rail foot, the tag configured to be attached to the rail foot in the transverse direction of the rail, the tag comprising:

a base body which partially encloses the rail foot, and
a label which contains information of the rail,
wherein the base body has a C-shaped configuration and includes an upper lip and a lower lip, the label located on an upper side of the upper lip, an underside of the upper lip configured to be compatible with a profile of the rail foot and extending over a top of the rail foot,
wherein the tag further comprises a fastener that attaches the base body to the rail, wherein the fastener is located on an upper side of the lower lip, the fastener made of adhesive material, and
wherein an underside of the lower lip includes a reinforcing protrusion.

2. The tag of claim 1, wherein the adhesive material includes adhesive glues, an adhesive tape, or an adhesive strip.

3. The tag of claim 1, wherein the fastener is used for attaching the tag to a bottom of the rail foot.

4. The tag of claim 1, wherein the base body includes another upper lip, the lower lip extending along a bottom of the rail foot and integrally connecting the two upper lips, the two upper lips respectively holding the two sides of the rail foot.

5. The tag of claim 4, wherein the upper lip includes an engaging tip for holding the tag onto the rail foot.

6. The tag of claim 5, wherein the base body includes a groove on an upper side of a lower tip and the engaging tip includes a slope feature.

7. The tag of claim 1, wherein the label is designed as an adhesive sticker or as an imprint which is made by printing, laser engraving or cutting, or as electronic data identification, the label including a two-dimensional code (e.g., QR code or data matrix).

8. The tag of claim 1, wherein the upper lip is disposed horizontally or at an angle to allow the label to be read.

9. A rail comprising the tag of claim 1, wherein the rail includes a weld joint.

10. The tag of claim 1, wherein the base body is made of rubber, plastic, metal, wood, or polymer composite.

11. The tag of claim 1, wherein the information includes a used process and material, date of execution, ingredient, quality, characteristic, function, feature, purpose, history, or use of the rail or of a weld joint of the rail.

12. The tag of claim 1, wherein the upper side of the lower lip extends parallel to a lower side of the rail foot.

13. A tag for providing information of a rail, the rail comprising a rail head, a rail web and a rail foot, the tag configured to be attached to the rail foot in a transverse direction of the rail, the tag comprising:

a base body which partially encloses the rail foot, and
a label which contains information of the rail,
wherein the base body has a C-shaped configuration and includes an upper lip and a lower lip, the label located on an upper side of the upper lip, an underside of the upper lip configured to be compatible with a profile of the rail foot and extending over a top of the rail foot,
wherein the tag further comprises a fastener that attaches the base body to the rail, wherein the fastener is located on an upper side of the lower lip, the fastener made of magnet, and
wherein an underside of the lower lip includes a reinforcing protrusion.

14. The tag of claim 13, wherein the fastener is used for attaching the tag to a bottom of the rail foot.

15. The tag of claim 13, wherein the base body includes another upper lip, the lower lip extending along a bottom of the rail foot and integrally connecting the upper lip and the another upper lip, the two upper lips respectively holding the two sides of the rail foot.

16. The tag of claim 15, wherein the upper lip includes an engaging tip for holding the tag onto the rail foot.

17. The tag of claim 16, wherein the base body includes a groove on the upper side of the lower tip and the engaging tip includes a slope feature.

18. The tag of claim 13, wherein the label is designed as an adhesive sticker or as an imprint which is made by printing, laser engraving or cutting, or as electronic data identification, the label including a two-dimensional code (e.g., QR code or data matrix).

19. The tag of claim 13, wherein the upper lip is disposed horizontally or at an angle to allow the label to be read.

20. The tag of claim 13, wherein the rail includes a weld joint.

21. The tag of claim 13, wherein the base body is made of rubber, plastic, metal, wood, or polymer composite.

22. The tag of claim 13, wherein the information includes a used process and material, date of execution, ingredient, quality, characteristic, function, feature, purpose, history, or use of the rail or of a weld joint of the rail.

23. The tag of claim 13, wherein the upper side of the lower lip extends parallel to a lower side of the rail foot.

* * * * *